United States Patent Office 3,752,755
Patented Aug. 14, 1973

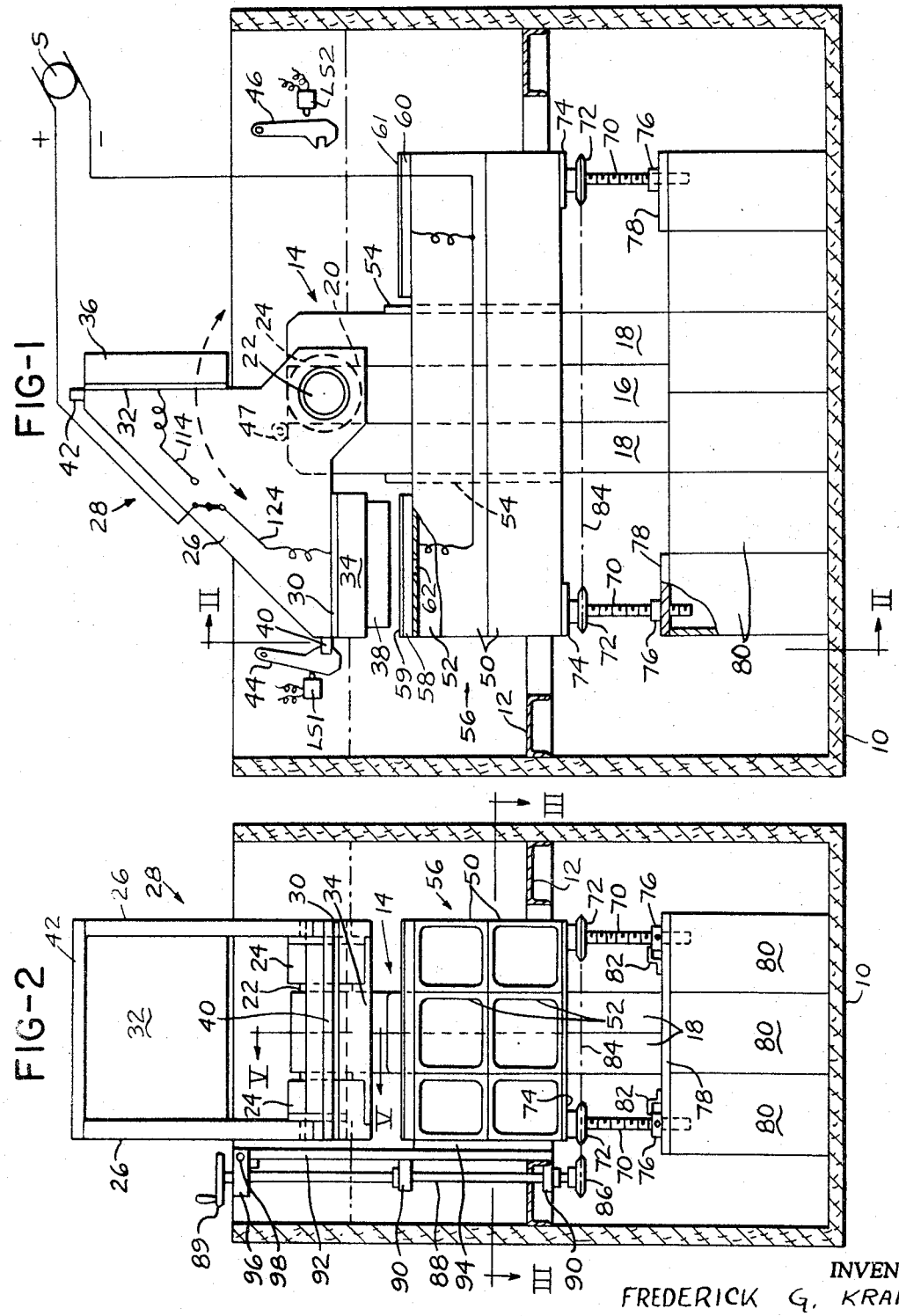

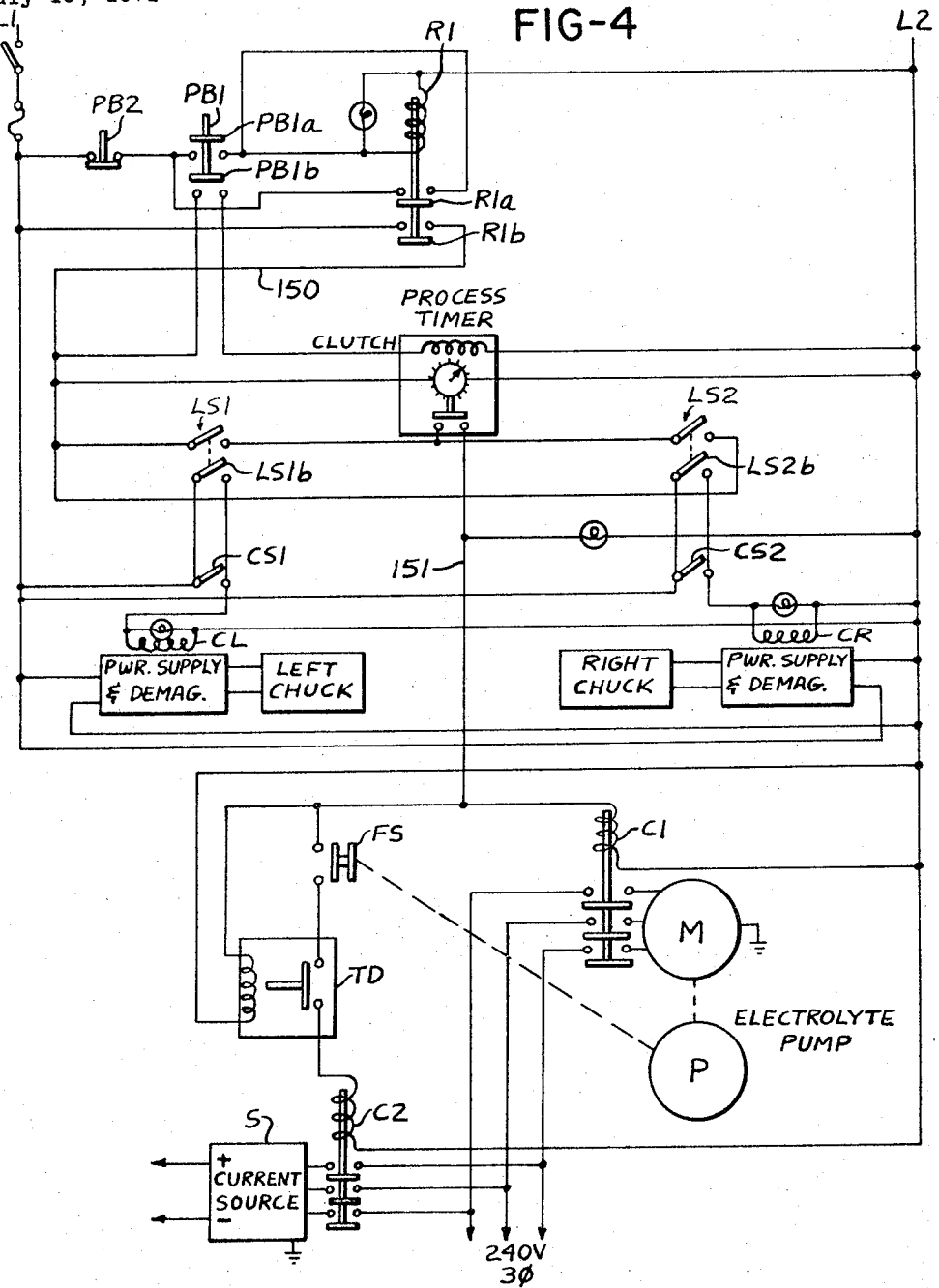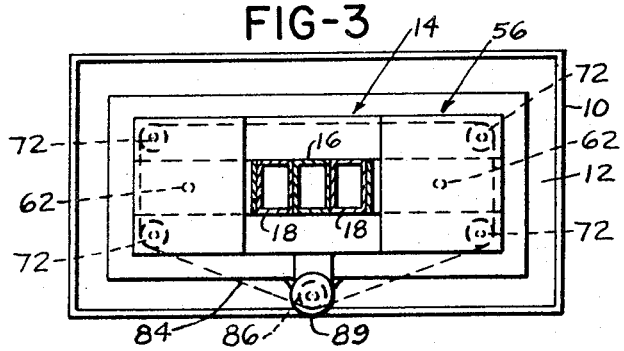

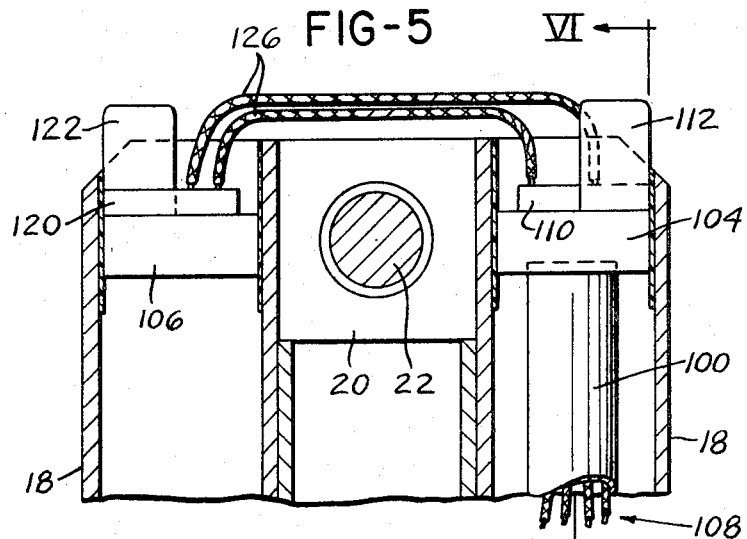
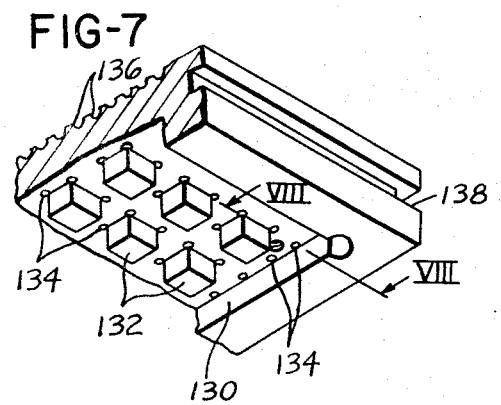
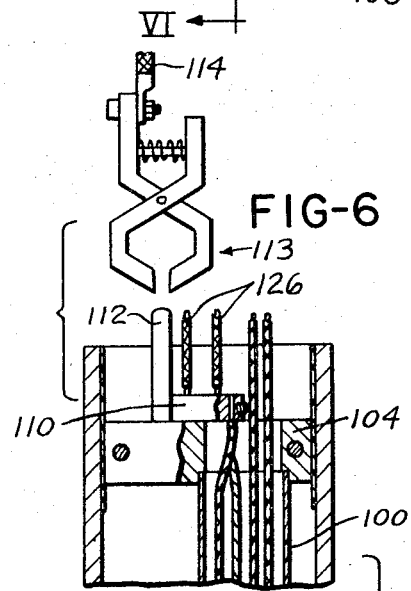
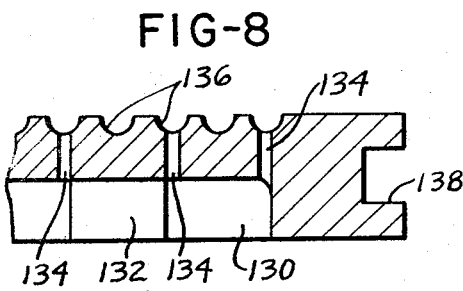
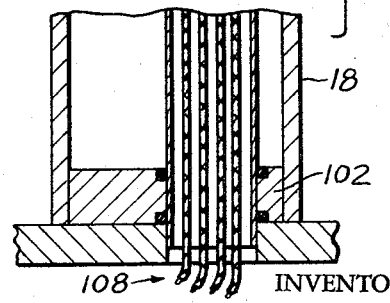

3,752,755
DEBURRING APPARATUS
Frederick G. Krafft, 2975 Fox Hollow Road,
Springfield, Ohio 45502
Filed July 15, 1971, Ser. No. 162,933
Int. Cl. B23p 1/12; C23b 5/70
U.S. Cl. 204—225                                  6 Claims

ABSTRACT OF THE DISCLOSURE

The specification discloses an electrolytic deburring machine having a tiltable work support table arranged so that when one work piece on a work station thereon is in working position, the other work station of the machine is tilted upwardly for being loaded. The machine is provided with a non-conductive tank to contain the electrolyte and in which the base and tiltable work support table are mounted. All components of the machine exposed to the electrolyte, other than the work piece supporting member, is constructed of electrically non-conductive material, such as alumina, or fiberglass, or the like.

---

This invention relates to an apparatus for electrolytic machining and in particular to an apparatus for electrolytic deburring.

Electrolytic machining is, of course, well known and is many times used for contouring workpieces that would otherwise be quite difficult to machine. The present invention is related to an electrolytic machining device that is concerned merely with deburring generally flat surfaces of metal workpieces. The burrs to be removed from workpieces according to the present invention are of the type that are imparted to a workpiece during, for example, a surface grinding operation.

A particular objective of the present invention is the provision of a machine of the nature referred to which is relatively inexpensive to build and operate.

Another objective of the present invention is the provision of a machine of the nature referred to which will operate very rapidly with a minimum amount of down time for changing workpieces.

It is also an object of the present invention to provide an electrolytic deburring machine which is readily adjustable to accommodate workpieces of different dimensions.

The foregoing objects as well as other objects and advantages of the present invention will become more apparent upon reference to the following detailed specification taken in connection with the accompanying drawings in which:

FIG. 1 is a side view of an electrolytic deburring machine according to the present invention with one side wall of the tank broken off to show the parts of the machine;

FIG. 2 is a transverse sectional view through the machine and is indicated by line II—II on FIG. 1;

FIG. 3 is a somewhat schematic plan sectional view and is indicated by line III—III on FIG. 2;

FIG. 4 is a schematic showing of an electric control circuit for the machine;

FIG. 5 is a fragmentary sectional view indicated by line V—V on FIG. 2;

FIG. 6 is a fragmentary sectional view indicated by line VI—VI on FIG. 5;

FIG. 7 is a fragmentary perspective view showing a cathode backing plate employed with the machine of the present invention; and FIG. 8 is a fragmentary section indicated by line VIII—VIII on FIG. 7.

BRIEF SUMMARY OF THE INVENTION

The machine of the present invention is formed of a tank having a structure therein which is substantially electrically nonconductive as, for example, by being formed of alumina, fiberglass, or the like, and of corrosion resisting metals with protective coatings or electrical polarities advantageously chosen to fulfill the purposes of the machine.

The structure comprises a column on which a tiltable head is mounted having two workpiece receiving regions disposed angularly relative to each other about the pivotal support of the head so that when one is in machining position, the other is elevated to a loading position.

The workpiece receiving area of the head which is in working position is opposed to a cathode supporting table which is vertically adjustable relative to the column and which has a cathode area complementary to each of the workpiece areas when the latter are in working position.

DETAILED DESCRIPTION OF THE INVENTION

Referring to the drawings somewhat more in detail, in FIGS. 1, 2 and 3, a machine will be seen to comprise a tank 10 which may be made up, for example, by fiberglass panels interconnected at the junctures thereof by fiberglass angles with the assembly being bolted together and sealed in any convenient manner. Details of the tank construction are not shown.

About midway of the height of the tank, it advantageously includes an internal stiffening rib 12 which may be in the form of a fiberglass channel extending completely around the inside of the tank.

The electrolytic deburring apparatus disposed in the tank comprises a central column, generally indicated at 14, and which column consists of a central tubular member 16 and side tubular members 18 arranged in face to face relation and fixedly secured together in any suitable manner. Members 16 and 18 are preferably formed of alumina or other suitable structural material.

The central tubular member 16 terminates about six inches below the top of the side members 18 and in the upwardly opening space thus provided there is disposed a bearing block 20 which rotatably supports a pin or shaft 22. The ends of the shaft 22 extend into bushing members 24 which are fixed to the spaced side plates 26 of the tiltable head of the machine and which is generally indicated by reference numeral 28.

The members 16 and 18 and 20, as mentioned, are formed of alumina or other suitable high strength corrosion resisting structural material and the material of bushing 24, shaft or pin 22 and side plates 26 of the head are formed of an electrically nonconductive material such as alumina or fiberglass.

The head 28 is generally triangular in configuration and carries an anode plate 30, 32 on each of the angularly related sides thereof. The sides on which the plates 30, 32 are mounted are advantageously arranged 90 degrees apart and when one thereof is in a horizontal position, the other is vertical. The one of the anode support plates which is in horizontal position is in working, or deburring, position and the vertical one thereof is elevated above the upper edge of tank 10 and is in loading position.

Each anode support plate has mounted thereon a work holding device such as a magnetic chuck 34, 36 which can be energized to hold workpieces of magnetic material thereon and demagnetized to release workpieces. In FIG. 1, one or more workpieces 38 are shown held by chuck 34 while chuck 36 is ready for being loaded with workpieces to be deburred. Simple jigs attached to the chucks set workpieces in proper alignment with mating cathodes.

Advantageously, the tiltable head 38 is provided with latch elements 40, 42 engageable by respective latch members 44, 46 with each latch member controlling a respective limit switch LS1, LS2. Specifically, each unit switch is held closed while the respective latch is engaging a latch element and is open when the latch is disengaged from the latch element.

Thus, in FIG. 1, limit switch LS1 is closed and limit switch LS2 is open. Further, a stop element 47 carried between the spaced side plates of the tiltable head engages the upper end of column 14 in each tilted position of the head to stop it with a respective side in working position.

The column 14 is surrounded by a table generally designated 56 in FIG. 1 which is formed of a pair of elongated superimposed tubular members 50 on each side of column 14 with shorter tubular tile members 52 being disposed between the tubular members 50 at the ends thereof. The table thus has a rectangular opening through which column 14 extends and is held against any substantial amount of movement laterally to the column by engagement with the four sides of the column. Members 54 are plates attached to the table to provide a flat cover for the inside openings of tiles 52. All bearing surfaces at table 58 which slide on column 14 are coated with a cemented layer of filled Teflon to reduce friction.

The aforementioned table 56 in FIG. 1 has attached thereon cathode plates 58, 60 and cathodes 59 and 61. Cathode 59 cooperates with workpiece 38 on workholding device 34 of tiltable head 28 and cathode 61 cooperates with the workpiece on workholding device 36 of the tiltable head. As will be seen hereinafter, electrolyte flows through each cathode backing plate being forced therethrough from an aperture 62 provided therebeneath in the respective one of tile members 52.

All of the parts of the table 14, except the cathode plates, are formed of material such as alumina or other noncorrosive material.

It has been mentioned that table 56 is vertically adjustable on column 14 and this is accomplished by vertical screws 70 arranged at the corners of the table and extending downwardly therefrom. The upper ends of the screws are fixed to sprockets 72 and take a journal in a bearing plate 74 extending laterally across the underside of the table at each end thereof. The screws 70 extend downwardly through nuts 76 which are adjustable mounted on a pair of nut plates 78 extending parallel to bearing plate 74 and therebeneath.

Plates 78 ara supported on the upper ends of tubular tile members 80, which may be the same size and shape as the aforementioned tile members 52 forming a part of the table, and are also formed of alumina or other suitable corrosive structural material. The nuts 76 are held in place by clamps 82 but are rotatable for adjusting the corners of the table relative to the other corners thereof.

The sprockets 72 have entrained thereover a drive chain 84 which engages a further sprocket 86 carried on the lower end of a shaft 88 having a hand wheel 90 at the upper end thereof. Shaft 88 is mounted in bearing blocks 90 which are fixed to a vertically extending channel member 92 that is, in turn, secured to a plate 94 mounted on the side of table 56. The screws and sprockets and chain and shaft 88 and nuts 76 are of corrosion resistant metal, but the other parts described are preferably formed of fiberglass. Nylon bearing inserts are used where practical.

Shaft 88 is also journaled at the upper end in a gear box 96 which includes gearing driving a digital counter 98 which can be availed of for indicating the exact position of adjustment of table 56 along column 14.

The electrical energy for being supplied to the workpieces and cathodes is derived from a source S which is schematically illustrated in FIG. 1 and wherein the opposite side of the source is also schematically shown as connected to a switching device which selectively supplies energy to the workpieces which are in machining position.

In practice, however, the wires leading from the source to the anodes are brought into the apparatus through the bottom wall of tank 10 and up through one of the side members 18 of column 14. FIGS. 5 and 6 show the manner in which the positive polarity electric supply cables can be led into the apparatus through the bottom wall of the tank. One of the members 18 of column 14 has therein an insulating tube 100 which, at its lower end, engages a base member 102 seated on the bottom wall of tank 10 and sealed thereto. The upper end of tube 100 extends into a nonconductive block 104, fiberglass, for example, which is fixed in the upper end of the respective tubular member 18.

The other tubular member 18 carries a corresponding nonconductive block 106, but has no tube corresponding to tube 100 therein.

The positive polarity electric supply cables are indicated at 108 and lead upwardly through tube 100 and at the upper end of tube 100 two of the cables are connected to a copper block 110 mounted on member 104. Also connected to copper block 110 is a copper plate 112 which mates with receptacle jaw 113 mounted in tiltable head 28 in such a position as to establish an electrical connection through cable 114 to the frame of workholding device 36 only when it is in the machining orientation.

Two other ones of Tables 108 lead from the upper end of tube 100 over the top of the column 14 and are connected to a copper block 120 resting on fiberglass block 106 and to which is fixed a copper blade 122, which by rotation of the tiltable head 28 can engage a set of receptacle jaws having connected thereto a cable 124 leading to the frame of workholding device 34. Thus the anode assembly that is in working position is capable of receiving power and the anode assembly in the loading position is electrically isolated.

Still further, a pair of cables 126 lead between copper blocks 120 and 110. The negative polarity cables from source S to the cathode backing plates are brought upwards parallel to the column in a fiberglass channel which is centrally affixed on one exterior side of tank 10, pass through the tank wall above electrolyte level, attach to one cathode backing plate and then pass through a tubular table member 50 to the other cathode backing plate. Attachment to the cathode backing plates is made through the mounting studs of the cathode backing plates.

Turning now to FIGS. 7 and 8, a typical cathode backing plate is shown in fragmentary section and fragmentary perspective view. Each cathode backing plate, which may be, for example, copper, and is generally rectangular and has a recess 130 in the bottom formed by milling a grid-like pattern of slots into the bottom of the anode plate. The milling leaves spaced projections 132 so that a free passage is provided therein for electrolyte which is pumped into these passages through hole 62 in tile 52 and flows out of these passages through a plurality of drilled holes 134 distributed over the cathode plate, for example, at corners of projections 132 and along the periphery of recess 130.

The upper surface of the cathode backing plate is provided with a plurality of arcuate grooves 136 formed therein as by a ball-shaped milling tool and consisting of a grid-like pattern of grooves connecting with holes 134 to make electrolyte available to arbitrarily placed holes in the cathode. The cathode backing plate may, furthermore, comprise a peripheral notch 138 so that the cathode can be clamped to it by a C-shaped spring channel clip.

The cathodes 59 and 61 are copper clad fiberglass plates of the same outside dimensions as the cathode backing plates and are clamped, as described in the previous paragraph, to cover grooves 136. To form a new cathode for a new shape of workpiece mounted on workholding device 34 or 36, electrolyte passage holes are drilled in a blank copper clad plate where needed and then using the workpieces as a tool, the copper cladding directly beneath the workpieces is electrochemically removed by temporarily reversing the polarity of current source S.

The operation of the machine is under the control of a relatively simple electric circuit shown in FIG. 4. In FIG. 4, closing of pushbutton PB1 will complete a circuit through blade PB1a actuating the holding coil of relay R1, causing the relay to close its blades R1a and R1b. R1a is a holding coil latch contact for R1, and R1b connects power to line 150. Blade PR1b of PB1 provides a momentary path for the requisite pluse of power which starts the process timer.

The process timer contact blade can supply power to timed line 151 if and only if latch switch LS1, or LS2 is closed. This arrangement ensures that the electrolyte pump and the power source S will not be accidentally energized while the head 39 is unlatched. Blades LS1b and LS2b of LS1 and LS2 bypass the manually operated chuck switches CS1 and CS2 for the left and right magnetic chuck control coils CL and CR respectively, to ensure that during the machining process the workpieces are not released by mistaken opening of a chuck switch. Whenever the current path is broken to either chuck control coil CL or CR the circuit, indicated in block form as power supply and demagnetizer, there follows an automatic demagnetization of the chuck(s) and associated workpieces.

When the process timer energized timed line 151 the electrolyte pump is immediately started by contactor C1. The electrolyte pump intake is advantageously placed immediately under stiffening rib 12 of the tank so as to minimize foreign material pickup. The electrolyte pump discharges into a suitable two-way valve with 90 degrees indexing attached to tiltable head 28 and centered on the rotational axis of shaft or pin 22. The valve is so arranged that it selectively switches the pump discharge path to whichever side of the machine is in operating position.

For example, the electrolyte could enter hole 62, as mentioned earlier, from whence it would pass into the attached cathode backing place 58 from which the electrolyte would be distributed through the holes in cathode 59 and over the edges being deburred from whence the electrolyte would return to the tank.

The energizing of the current source S by contactor C2 takes place when electrolyte flow is sufficient to trip flow switch FS and the time delay switch TD completes the current path from timed line 151. The function of switch FS is to protect the cathodes and workpieces from damage due to serious electrolyte system failure. Switch TD allows a sufficient amount of time, approximately two seconds, for the electrolyte flow to stabilize before current is applied.

It will be appreciated that the machine according to the present invention can operate rapidly with very little idle time for loading and unloading and that the apparatus is inexpensive to construct and highly effective for the class of work referred to, namely, the deburring of electrically conductive workpieces, particularly workpieces with flat surfaces to remove therefrom burrs caused by surface grinding or other finish machining operations.

Modifications may be made within the purview of the appended claims.

What is claimed is:

1. In an apparatus for electrolytic machining: a tank, a column upstanding in the tank, a head tiltably mounted on the upper end of the column, said head having two anode areas thereon adapted to receive workpieces, and a cathode table in said tank having cathode means thereon, said head having a first tilted position on said column wherein one of said anode areas is presented to said cathode means while the other anode area is elevated into workpiece loading and unloading position and a second tilted position on said column wherein said other anode areas is presented to said cathode means while said one anode area is elevated into workpiece loading and unloading position.

2. An apparatus according to claim 1 in which said cathodes are presented upwardly on top of said table and means are provided for vertically adjusting said table in said tank.

3. An apparatus according to claim 2 in which said means for adjusting said table vertically in said tank comprises a screw extending downwardly from each corner of the table at the bottom, nuts in the tank receiving said screws, and means for rotating said screws in unison.

4. An apparatus according to claim 3 in which the means for rotating said screws comprises a vertical shaft rotatably mounted on one side of the table, coplanar sprockets on said screws and said shaft, and a drive chain entrained about said sprockets.

5. An apparatus according to claim 3 in which said nuts are adjustable angularly relative to each other.

6. An apparatus according to claim 1 in which said tank and column and head and table are all constructed of electrically nonconductive mechanically strong material.

References Cited

UNITED STATES PATENTS

| | | | |
|---|---|---|---|
| 3,658,684 | 4/1972 | Sickels | 204—224 X |
| 3,449,226 | 6/1969 | Williams | 204—224 X |
| 3,542,993 | 11/1970 | Buck | 204—143 R X |
| 3,384,563 | 5/1968 | Taylor | 204—143 R |

JOHN H. MACK, Primary Examiner

D. R. VALENTINE, Assistant Examiner

U.S. Cl. X.R.

204—297 R